(12) United States Patent
Durif

(10) Patent No.: US 7,413,039 B2
(45) Date of Patent: Aug. 19, 2008

(54) HEAVY VEHICLE

(75) Inventor: Pierre Durif, Enval (FR)

(73) Assignee: Michelin Recherche at Technique S.A., Granges-Paccot (CH)

( * ) Notice: Subject to any disclaimer, the term of this patent is extended or adjusted under 35 U.S.C. 154(b) by 0 days.

(21) Appl. No.: 11/444,669

(22) Filed: Jun. 1, 2006

(65) Prior Publication Data

US 2006/0213701 A1 Sep. 28, 2006

Related U.S. Application Data

(63) Continuation of application No. PCT/EP2004/013569, filed on Nov. 30, 2004.

(30) Foreign Application Priority Data

Dec. 2, 2003 (FR) .................................. 03 14168

(51) Int. Cl.
*B62D 61/10* (2006.01)

(52) U.S. Cl. .................. 180/22; 180/24.03; 180/24.06; 180/24.07; 280/124.115

(58) Field of Classification Search ............... 180/22, 180/24.01, 24.03, 24.06, 24.07, 212, 213; 280/124.115

See application file for complete search history.

(56) References Cited

U.S. PATENT DOCUMENTS

| 2,443,147 | A | * | 6/1948 | Ritchie | 180/20 |
|---|---|---|---|---|---|
| 3,319,545 | A | * | 5/1967 | Seaman et al. | 404/125 |
| 3,820,497 | A | | 6/1974 | Konijn | |
| 3,831,962 | A | * | 8/1974 | Cator et al. | 280/81.6 |
| 3,831,963 | A | * | 8/1974 | Campbell et al. | 280/81.6 |
| 4,036,304 | A | * | 7/1977 | Crow, Jr. | 172/260 |
| 4,131,170 | A | * | 12/1978 | van der Lely | 180/22 |
| 4,155,415 | A | * | 5/1979 | van der Lely | 180/22 |
| 4,181,315 | A | * | 1/1980 | van der Lely | 280/834 |
| 4,361,205 | A | * | 11/1982 | van der Lely | 180/329 |
| 4,591,018 | A | * | 5/1986 | van der Lely | 180/260 |
| 5,163,700 | A | * | 11/1992 | Loeber | 280/683 |
| 5,494,375 | A | * | 2/1996 | Yates | 404/126 |
| 6,105,707 | A | * | 8/2000 | Tamura et al. | 180/307 |
| 6,247,233 | B1 | * | 6/2001 | Hinton et al. | 29/894.3 |

FOREIGN PATENT DOCUMENTS

| CA | 2 263 615 A | 8/1999 |
|---|---|---|
| GB | 2 135 641 A | 9/1984 |

* cited by examiner

*Primary Examiner*—Toan C To
(74) *Attorney, Agent, or Firm*—Cohen Pontani Lieberman & Pavane LLP

(57) ABSTRACT

Presented is a heavy vehicle, such as a transport vehicle or a civil engineering vehicle, of a mass greater than 500 metric tons. The vehicle is fitted with tires of radial structure having a diameter greater than 3.5 meters and an axial width greater than 37 inches. The vehicle has a front steering axle provided with at least two tires and at least one rear axle provided with at least four tires for transmitting at least part of motive power. The rear axle has at least two trailing arms each associated with two tires.

16 Claims, 5 Drawing Sheets

HEAVY VEHICLE

CROSS REFERENCE TO RELATED APPLICATIONS

This is a continuation of International Application No. PCT/EP2004/013569, filed on Nov. 30, 2004, which claims priority from French Patent Application No. 03/14168, filed on Dec. 2, 2003, the content of which is hereby incorporated by reference.

BACKGROUND OF THE INVENTION

1. Field of the Invention

The invention relates to a heavy vehicle such as a transport vehicle or a "civil engineering" vehicle, of a mass greater than 500 metric tons and fitted with tires of a diameter greater than three meters fifty having an axial width greater than 37 inches.

2. Description of Prior Art

Such vehicles, generally designed for carrying heavy loads, comprise a front steering axle comprising two steering wheels and a rear axle, which is most frequently rigid, comprising four driving wheels distributed in pairs on each side.

An axle is defined as an assembly of the elements enabling the fixed structure of the vehicle to be connected to the ground.

The axial or transverse direction of the tire is parallel to the axis of rotation of the tire.

The circumferential direction of the tire, or longitudinal direction, is the direction corresponding to the periphery of the tire and defined by the rolling direction of the tire.

The axis of rotation of the tire is the axis around which it turns in normal use.

In the case of vehicles in particular intended for use in mines or quarries for transporting loads, the problems of access and demands of production lead the manufacturers of these vehicles to increase their loading capacity. It follows that the vehicles become ever larger and thus ever heavier in themselves and are capable of transporting an ever greater load. The current masses of these vehicles may reach several hundred metric tons, the same being true of the load to be transported; the total mass may reach 650 metric tons.

Since the loading capacity of the vehicle is directly linked to that of the tires, it is known that, to increase this loading capacity, it is necessary to increase the amount of air contained in the tires.

At present, as stated above, vehicles of this type, such as dumpers used in mines, comprise a rear axle on which are mounted four wheels, arranged in pairs, to respond to these demands.

Furthermore, the dimensions of said wheels and consequently those of the tires and in particular the rigidity of the lower zones require said wheels to be made in several parts to allow mounting of the tire on a rim. The operations involved in mounting and demounting said fires in the event of replacement or maintenance are long and tedious. The number of clamping parts which have to be handled during these operations may be greater than 200, and very high levels of clamping torque are associated therewith. The time taken for these operations is consequently very long and therefore detrimental to the productivity sought during exploitation of said mines.

Since current demands tend towards a constant increase in the loading capacity of these vehicles, the various parameters listed above have resulted in widening of the tires so as to increase the volume of air therein. At around 4 meters, tire diameter is now such that it is virtually impossible to increase it further, in particular for reasons of transportation of said tires. In fact, the dimensions of said tires will be limited by transportation thereof, in particular by road widths and bridge headroom. It is likewise virtually impossible to decrease the rim diameter, which in particular allows positioning of the driving torque transmission system and of the braking systems and furthermore allows torque transmission via the bottom zone of the tire.

SUMMARY OF THE INVENTION

During their studies, the inventors have succeeded in demonstrating that these "widened" tires do effectively allow an increase in transported load but exhibit various drawbacks. Tests have in fact shown that the wear resistance of these tires and the endurance thereof are reduced with respect to that of current tires. This results in premature wear of the tires and thus a drop in the efficiency of the vehicles and a reduction in productivity.

Furthermore, patent application WO 00/71365 describes a method making it possible to simplify tire mounting, the latter being mounted directly on the hub, which serves as the rim. Independent rings then act as rim seats and are held in place by locking rings, which are connected firmly to the hub as a result in particular of being complementary in profile.

The inventors thus set themselves the task of responding to a new demand from users, who wish to see a further increase in the loading capacity of load-carrying vehicles, in particular those used in mines, the properties of the tires in terms of wear and endurance remaining unimpaired with respect to those of current tires and advantageously being improved.

This aim is achieved according to the invention by a heavy vehicle, such as a transport vehicle or a "civil engineering" vehicle, of a mass greater than 500 metric tons, fitted with tires of a diameter greater than three meters fifty having an axial width greater than 37 inches, and comprising a front steering axle provided with at least two tires and a rear axle, by which is transmitted at least part of the motive power and comprising at least two trailing arms each associated with two tires.

For the purposes of the invention, a trailing arm must be understood as being capable of oscillating in only one direction; it has only one degree of freedom in a longitudinal plane of the tire, that is to say in a plane perpendicular to the axis of rotation of the tires of the rear axle.

The invention thus proposes in particular to associate the tires of the rear axle with trailing arms whose suspension systems are independent and will thus allow a better distribution of the contact patches, and thus of the stresses withstood by the tires. In effect, unlike with a rigid axle, the contact patches between the tires and the ground are better distributed between the different tires, the independent suspension systems of the trailing arms allowing account to be taken of the contours of the tracks followed by this type of vehicle. The tracks actually suffer deformations resulting for example in rutting. A vehicle constructed according to the invention makes it possible to travel on uneven ground. Furthermore, the vehicle according to the invention causes less damage to the tracks, in particular due to the better load distribution, and makes it possible to cut down on track maintenance and also to increase service life on sites where the ground is particularly dependent on climate.

An advantageous variant of the invention further provides for the trailing arms to be equipped with a device allowing oscillation around an axis perpendicular to the axis of rotation of the tires and substantially parallel to the plane of the ground, said axis passing between two tires paired with a trailing arm and for example belonging to said trailing arm. Such an embodiment improves still further the better distribution of the contact patches between the tires of the vehicle, following the contours of the ground extremely well.

The design of the vehicle according to the invention, in particular due to independent suspension devices attached to each of the trailing arms, also makes it possible to control roll motion in a simplified manner relative to conventional vehicles in which calibration of the suspension devices is very tricky.

According to a preferred embodiment of the invention, the suspension devices are fixed to the trailing arms at the ends of said trailing arms independent of the chassis and at a distance from the chassis which is greater than that separating the axis of rotation of the tires from the chassis. Such an embodiment of the invention results in an increase in the displacement of the suspension devices, which allows shock absorption to be progressive.

According to a preferred embodiment of the invention, in particular to increase still further the loading capacity of the vehicle and thus to live up to the expectations of users, the rear axle comprises three trailing arms each associated with two tires.

Such an embodiment thus makes it possible to associate six tires with the rear axle of the vehicle. Association of these tires with three trailing arms makes it possible, in particular, to limit bulk in the axial direction, the third arm coming in between the first two and thus not resulting in an increase in the width of the vehicle or resulting at the very most in only a slight increase in said width in the case of certain tires.

Another parameter which has to be taken into account in the design of such a vehicle is in fact its bulk and more specifically its width. In fact, this type of vehicle is, for example, intended for use in mines, where it has to follow tracks formed in the mountainside which are in most cases of a width which is limited because they were cut to optimum size, a procedure which in itself consequently requires transportation of earth and rocks. It is clear that the vehicle embodiment according to the invention is entirely advantageous since it makes it possible to increase loading capacity in combination with an acceptable vehicle width.

Such a vehicle embodiment thus makes it possible to increase the loading capacity of this type of vehicle while retaining satisfactory wear properties which are not downgraded with regard to the current situation. The inventors have demonstrated in particular that widening of the tires to achieve an increase in loading capacity, in particular when they are arranged in pairs either side of an axle, results in an increase in wear, in particular due to the presence of curved trajectories which the vehicles follow.

According to a preferred embodiment of the invention, and in particular when the vehicle comprises a dump body tiltable about a substantially horizontal axis, the trailing arms are individually associated with suspension systems and the axis of the suspension systems intersects with the axis of rotation of the tiltable dump body. According to this variant embodiment of the invention, the dump body is supported at least in part directly on the suspension devices of the rear axle and thus transfers its load to the tires quasi-independently of the chassis of the vehicle.

Advantageously, the invention provides for at least one trailing arm to be raisable, that is to say its position relative to the ground may be varied between at least two positions, one allowing the tires to be in contact with the ground and thus to contribute to bearing of the load. The other position, or upper position, makes it possible to keep the tires at a distance from the ground.

This latter position makes it possible, for example, to prevent wear of said tires when the vehicle is empty, that is to say when it is not transporting a load, and therefore when the tires of the other axles are sufficient to carry the vehicle load. A preferred embodiment of the invention for obtaining this effect provides a vehicle whose rear axle comprises three trailing arms, the central arm being raisable and brought into the upper position and thus out of contact with the ground when the vehicle is empty.

According to other variant embodiments of the invention, at least the lateral, or axially outer, arms are raisable, in particular with a view to facilitating demounting, mounting and/or replacement of the tires.

According to the latter variant embodiment and according to a first embodiment of the invention, the lateral, or axially outer, trailing arms are advantageously associated with a device which enables them to pivot around an axis perpendicular to the plane of travel. At the time of such an operation, the suspension devices are firstly detached either from the chassis or from the arm to allow such rotation. The arm is then pivoted about said vertical axis such that operators may carry out operations on the fixing means of the tires and/or of the wheels of said arm. When a trailing arm is returned to the travel position, it is advantageously coupled to a part of the chassis to create a rigid connection with the chassis. This coupling with the chassis is advantageously effected at the level of the axis about which the trailing arm oscillates in a longitudinal plane.

According to another embodiment of the invention facilitating operations carried out on the tires, the central, or axially inner, trailing arm may pivot in a longitudinal plane perpendicular to the plane of travel, by an angle of at least 90° in the direction of the plane of travel. According to this embodiment, the vehicle is placed beforehand over a pit allowing downward pivoting of the central trailing arm.

To ensure stability of the vehicle during this type of operation, the vehicle is advantageously put on blocks, for example with the assistance of piston-cylinder units connected firmly with the chassis and which come to rest on the ground. Any other means known to the person skilled in the art may also be used.

According to one variant embodiment of a vehicle according to the invention, still with a view to increasing the loading capacity of the vehicle, the front axle comprises four tires arranged in pairs either side of said axle.

Preferably, the tires of the front axle are associated in pairs with a substantially vertical turning shaft and, also preferably, the two tires are distributed symmetrically relative to said axles. Such an embodiment allows uniform distribution of the load around the turning shaft, which in particular allows a reduction in the mechanical stresses suffered by the chassis.

The turning shafts furthermore advantageously coincide with the axes of the suspension devices, so as in particular also to improve load distribution. Preferably, the suspension devices incorporate the turning shafts.

As far as turning of the tires is concerned, this is advantageously controlled by the instructions imposed by the steering wheel as it performs independent actuation of the two turning shafts, for example by a system of the electro-hydraulic type. This independent control of the two turning shafts may be controlled by an electronic card based on a theoretical law of the Jeantaud or Ackermann type, whose aim is to minimize wear to and/or the endurance of the tires. The primary actuation systems, known as master systems, of each of the turning shafts may be additionally supplemented by more rudimentary safety systems which step in the event of failure of one of the master systems.

This type of independent actuation of the two turning shafts is particularly well adapted to the type of vehicle according to the invention, in particular for improving tire wear and endurance. This actuation system makes it possible, in particular, to achieve freedom from the effects of load variations on the tires of the front axle and more specifically on the alignment of said tires. However, an actuation system of this type, as described, should not be understood as being limited to this type of vehicle, but may apply to all types of vehicle.

Furthermore, the dump body advantageously rests on the top of these suspension shafts. Said dump body is thus supported virtually directly by the different suspension systems of the vehicle, which are themselves in virtually direct contact with the tires. According to such an embodiment, it is thus possible to simplify considerably the structure of the chassis of the vehicle relative to that of current vehicles. This simplification of the structure of the chassis has a direct impact on the weight of the vehicle. Furthermore, it may make it possible to provide a relatively free central portion and consequently allow the bottom part of the dump body to pass through, said dump body having a different shape from that of conventional vehicles. Such an embodiment thus makes it possible for the vehicle to have a relatively low centre of gravity.

The dump body furthermore advantageously comprises two concave zones which rest directly on the top of each of the suspension devices and thus lead to locking of the dump body, preventing any risk of lateral movements. This locking which stabilizes the dump body additionally makes it possible to limit the stresses on the various fixing means of the suspension devices.

Also advantageously, the axes of rotation of the front axle exhibit possible rotation over at least 90° relative to the longitudinal direction and thus make it possible to position the tires in such a way that the axis of rotation of said tires substantially coincides with the direction of forward movement of the vehicle in a linear direction, or longitudinal direction of the vehicle, and in such a way that the tire axially to the inside during movement of the vehicle is then in a position such that it is furthest from the rear axle. This configuration makes it possible in particular to get at the tire axially to the inside during movement, so as to perform an operation such as change thereof. Such an operation is advantageously accompanied by putting the vehicle on blocks or any other means known to the person skilled in the art, such as stated above with reference to an operation of the same type on the rear axle.

Also advantageously, the rear axle comprises at least four tires and at least two tires transmit at least part of the motive power. According to this embodiment, for example in the case of four tires, two tires and preferably the two axially outer tires on the rear axle do not advantageously transmit the motive power and have as their only essential function that of bearing part of the load. Such an embodiment makes it possible to reduce the longitudinal stresses arising in particular when the vehicle follows the course of a bend. In fact, when a vehicle comprising paired or twin tires follows the course of a bend, the tires which are axially furthest to the outside cover a greater distance if positioned on the outside of the bend and a smaller distance if positioned on the inside of the bend.

According to these latter variant embodiments in particular, the invention also provides for at least some of the tires of the front axle advantageously to transmit part of the motive power.

In a variant embodiment, the invention also provides for the front axle to comprise four tires, at least two tires of said front axle transmitting part of the motive power, as stated above.

Preferably, the two axially inner tires are preferably the tires transmitting the motive power.

The involvement of two tires of the front axle transmitting part of the motive power will promote handling of the vehicle and contribute to a reduction in wear to the tires of the rear axle, in particular when the part of the motive power transmitted by these tires is reduced due to the involvement of the tires of the front axle in transmission of the motive power.

A reduction in wear to the tires fitted on the front axle has also been noted, in particular on a bend. The inventors explained this reduction in wear to the tires fitted to the front axle as being due in particular to the reduction in load transfer and transverse forces; the inventors have demonstrated that, according to the invention, the motive power generates directional forces in the front axle prior to a locking situation due to the thrust forces of the rear axle and to the inertia forces at relatively high speeds. The locking situation corresponds to a situation in which the vehicle follows a substantially rectilinear trajectory despite the wheels of the front axle being turned.

Since this type of locking situation increases with the vehicle load and the speed thereof, it would appear that the vehicle according to the invention makes it possible to ensure the possibility of turning, whether the vehicle has a greater load and/or is moving at higher speeds and/or the radius of curvature of the trajectory to be followed is smaller in comparison with the current situation.

Another variant embodiment of the invention provides for at least two tires, preferably the tires of the rear axle axially to the outside, not to transmit the motive power solely when the vehicle is following a trajectory which is not rectilinear, or preferably when it is following a bend whose radius of curvature is less than a predetermined value. Such an embodiment may be achieved by an absolute or relative decoupling device, such as a differential gear or a viscous clutch, between said tires and the members transmitting the motive power. Such a device may be actuated by the vehicle's steering members according to any means known to the person skilled in the art.

In the same manner, the invention advantageously provides for the variant in which at least two tires of the front axle transmit part of the motive power to take effect only when the vehicle is following a trajectory which is not rectilinear, or preferably when it is following a bend whose radius of curvature is less than a predetermined value. As above, such an embodiment may be achieved by an absolute or relative decoupling device, such as a differential gear or a viscous clutch, between the tires and the members transmitting the motive power.

The invention also provides for a vehicle such as described above, each of whose tires is associated with an electric motor, for example incorporated in the wheel associated with the tire or in the trailing arm associated with said tire in the case of an embodiment according to the method described in document WO 00/71365 examined again below.

According to these various possible embodiments, the use of electric motors associated with a tire makes it possible to distribute the motive power variably as a function of the tires and of the trajectory followed.

In the same manner, the invention also provides for some only of the tires transmitting the motive power to be actuated by electric motors; these tires may for example be the tires of the front axle, those of the rear axle retaining conventional motorization and transmission.

When the motive power is due only to the electric motors, the invention also provides for certain ones only of the tires to be associated with such electric motors and for the other tires to have only load-bearing as their essential function.

According to other variant embodiments, the electric motors are incorporated in the trailing arms in association with a reducer or alternatively reducers are incorporated into the hubs so as to associated individually with a tire. When a single reducer is associated with a motor, a differential gear may also be used between the two tires carried by one and the same trailing arm.

The invention also advantageously provides, in the case of conventional motorization and transmission, for the transmission elements, such as homokinetic slip joints, to be incorporated into the trailing arm in such a way, in particular, that the heat supplied by these elements dissipates easily and is not transmitted to the tire. The reduction in this heat supply relative to conventional methods makes it possible to improve tire endurance.

In the same manner, whatever the transmission method, the trailing arms of the vehicle, according to an advantageous embodiment of the invention, are designed to incorporate the brake discs such that the heat produced by heating thereof during braking is likewise not transmitted to the tires. This embodiment of the invention furthermore makes it possible to provide braking devices of a diameter greater than those of conventional vehicles, the maximum diameter of which is limited by the internal diameter of the wheels of said conventional vehicles.

Such an increase in the diameter of the braking devices in particular makes it possible to fulfill the braking requirements imposed by vehicles whose fully loaded mass may exceed 1000 metric tons.

Whatever the embodiment of the invention, it is additionally advantageously always provided for all the tires to remain individually associated with a braking device, so as to be able to slow down or stop this type of vehicle under the best conditions, that is to say in such a way as to limit wear to the tires.

The invention also advantageously proposes to combine the vehicle as defined above with wheel-less mounting on the trailing arms, the tires being set in place on a hub associated with a trailing arm provided to this end through the intermediary of first mounting rings forming the tire bead seats and second locking rings ensuring positioning of said first rings and therefore of the tires. Mounting of this type has already been described in the above-cited patent application WO 00/71365. According to this embodiment, the invention requires that recesses be provided on the hubs of the trailing arms to accommodate the locking rings, positioning of two of these rings being necessary per tire. Such a mode of tire mounting makes it possible to improve still further the efficiency of the vehicle according to the invention, which, in addition to slower wear of the tires, allows operations to be performed more quickly in the event of tire change.

The vehicle thus proposed according to the invention makes it possible, as stated above, to increase the load carried relative to conventional vehicles while safeguarding the properties of the tires in terms of wear and endurance, or indeed improving them.

Furthermore, the design of the vehicle, in particular when the latter is equipped with three trailing arms on the rear axle and comprises four tires on the front axle, makes it possible to avoid the risks of immobilizing the vehicle on its track. In effect, the design thereof allows it to turn round in precarious conditions at a maintenance site with one ruined tire on the front axle and up to two ruined tires on the rear axle.

Finally, since the structure of the chassis is only slightly stressed and may be constructed in the form of a box, it is possible in particular to provide for insertion of the elements such as the fuel, oil and cooling water tanks inside the chassis. Such designs may result in a still greater improvement in the lowering of the centre of gravity of the vehicle and optionally in weight gains.

The invention also proposes a process for carrying out operations on a tire disposed on the rear axle of a vehicle, said tire being associated with another tire and the two tires together being associated with a trailing arm, said process comprising the following steps:
 putting the vehicle in a position where it is supported on at least one block,
 raising the trailing arm by means of associated suspension devices,
 locking the trailing arm in a raised position,
 detaching one end of the suspension device,
 pivoting the trailing arm around a vertical axis passing through the end of the trailing arm connected firmly with the chassis.

The process thus described according to the invention makes it possible, as stated above, to perform operations on the tires of a vehicle such as that described above, in particular for mounting or changing a tire. However, the process as described should not be understood as being limited to this type of vehicle but applies to all types of vehicle comprising trailing arms associated individually with at least two tires.

BRIEF DESCRIPTION OF THE DRAWINGS

Other advantageous details and features of the invention will become clear below from the description of examples of embodiment of the invention made with reference to FIGS. 1 to 5, in which.

DETAILED DESCRIPTION OF THE PREFERRED EMBODIMENTS

To simplify understanding thereof, the Figures are not to scale.

Figure 1:
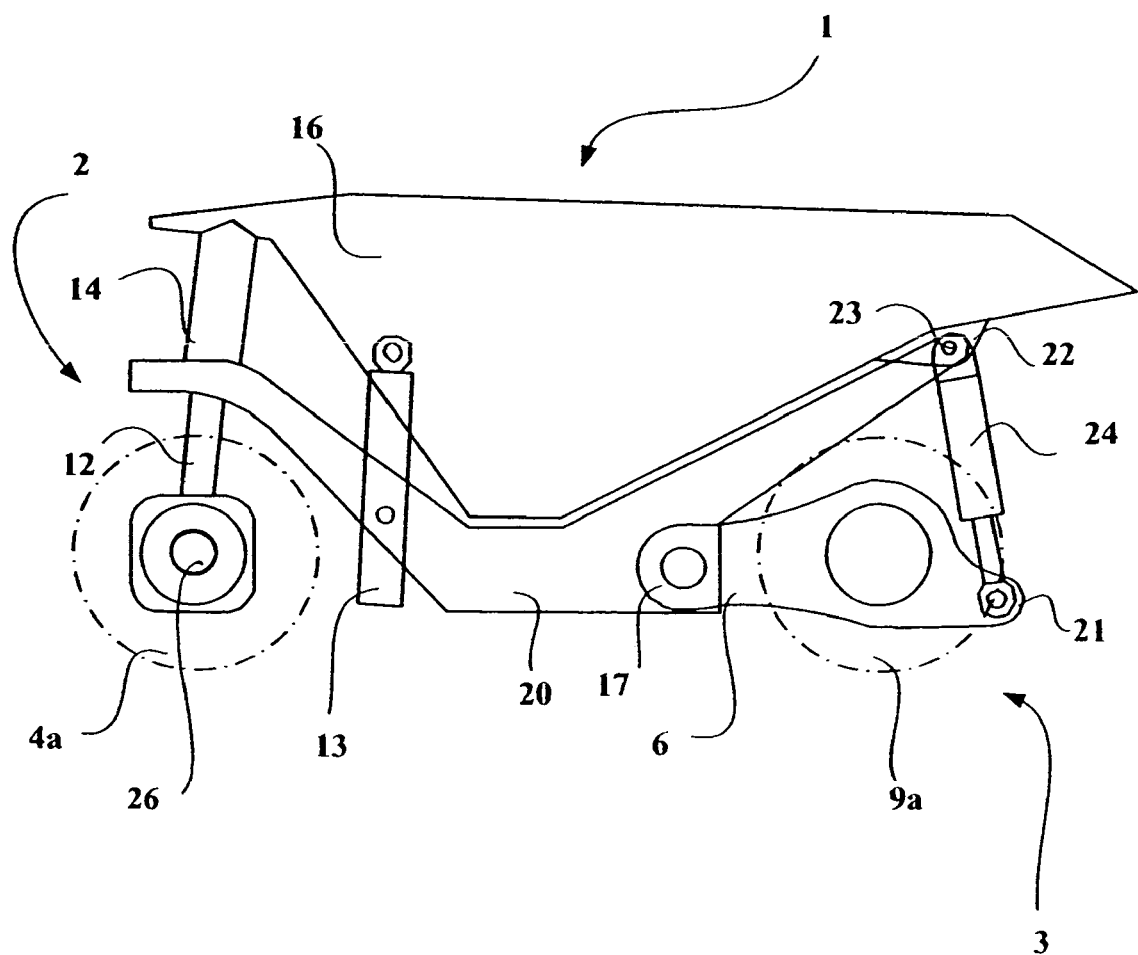
FIG. 1 is a schematic representation of a side view of a vehicle according to the invention.
Figure 2:
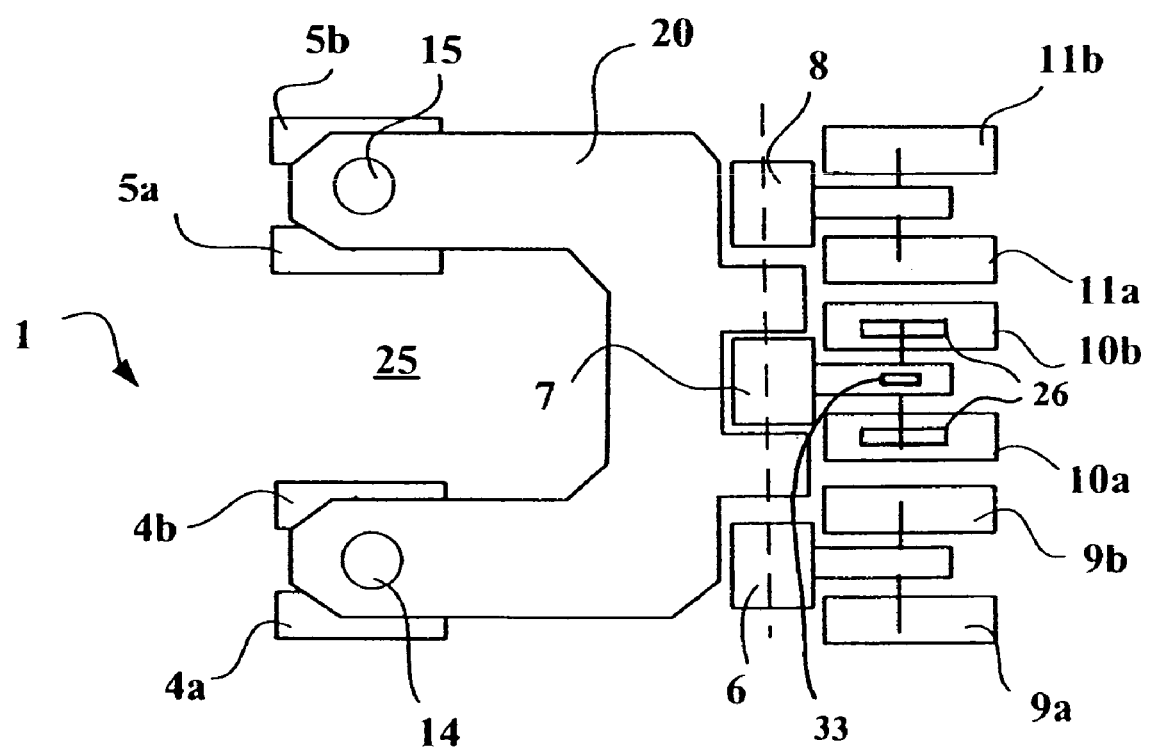
FIG. 2 is a schematic representation of a plan view of the vehicle of FIG. 1.

FIGS. 1 and 2 are schematic representations of a vehicle 1 constructed in accordance with the invention, which comprises a front axle 2 comprising four tires 4a, 4b, 5a, 5b arranged in pairs and a rear axle 3 equipped with three trailing arms 6, 7, 8 and comprising six tires 9a, 9b, 10a, 10b, 11a, 11b distributed in pairs on the three arms 6, 7, 8.

The vehicle 1 shown diagrammatically in this FIG. 1 is a heavy vehicle of the dumper type having a total loaded weight of the order of 1000 metric tons.

The various tires with which the vehicle is fitted are large tires whose aspect ratio H/S is equal to 1, H being the height of the tire on the rim and S the maximum axial width of the tire when the latter is mounted on its service rim and inflated to its recommended pressure. The tires are of dimension 44R69.

These tires comprise a radial carcass reinforcement composed of inextensible metal cables of steel, oriented radially and anchored in each tire bead.

The tires are mounted using the method described in patent application WO 00/71365. According to this method, each trailing arm of the vehicle and more precisely each hub of each of the trailing arms is designed to receive the tires through the intermediary of rings having a surface forming the tire bead receiving seat. The surface of these rings is advantageously frustoconical in shape. The receiving rings are themselves locked on the hub of the axle through the intermediary of locking rings, one part of whose surface is complementary in shape to that of recesses provided on said hub in which said locking rings are inserted.

The tires 4a, 4b, 5a, 5b of the front axle 2 are associated in pairs 4a, 4b on the one hand and 5a, 5b on the other hand with two substantially vertical turning shafts 12 and preferably each pair of tires is also distributed symmetrically relative to each of the shafts 12. Such an embodiment allows uniform distribution of the load around the axis of rotation, which in particular allows a reduction in the mechanical stresses suffered by the chassis. The axes of rotation furthermore coincide with the axes of the suspension devices 14, 15.

The load-carrying dump body 16 advantageously rests on the top of these suspension devices 14, 15.

The turning shafts 12 of the front axle 2 additionally exhibit possible rotation over at least 90°, relative to the longitudinal direction, which will be examined below.

As stated above, the rear axle 3 is equipped with three trailing arms 6, 7, 8 and comprises six tires 9a, 9b, 10a, 10b, 11a, 11b distributed in pairs on the three arms 6, 7, 8. The trailing arms 6, 7, 8 are on the one hand connected firmly with the chassis 20 by one of their ends 17; on the other hand, they are individually linked to the suspension devices 24 by their other ends 21. These suspension devices are additionally linked to an upper part 22 of the chassis and their axes intersect with the axis of rotation 23 of the dump body 16.

Figure 3:
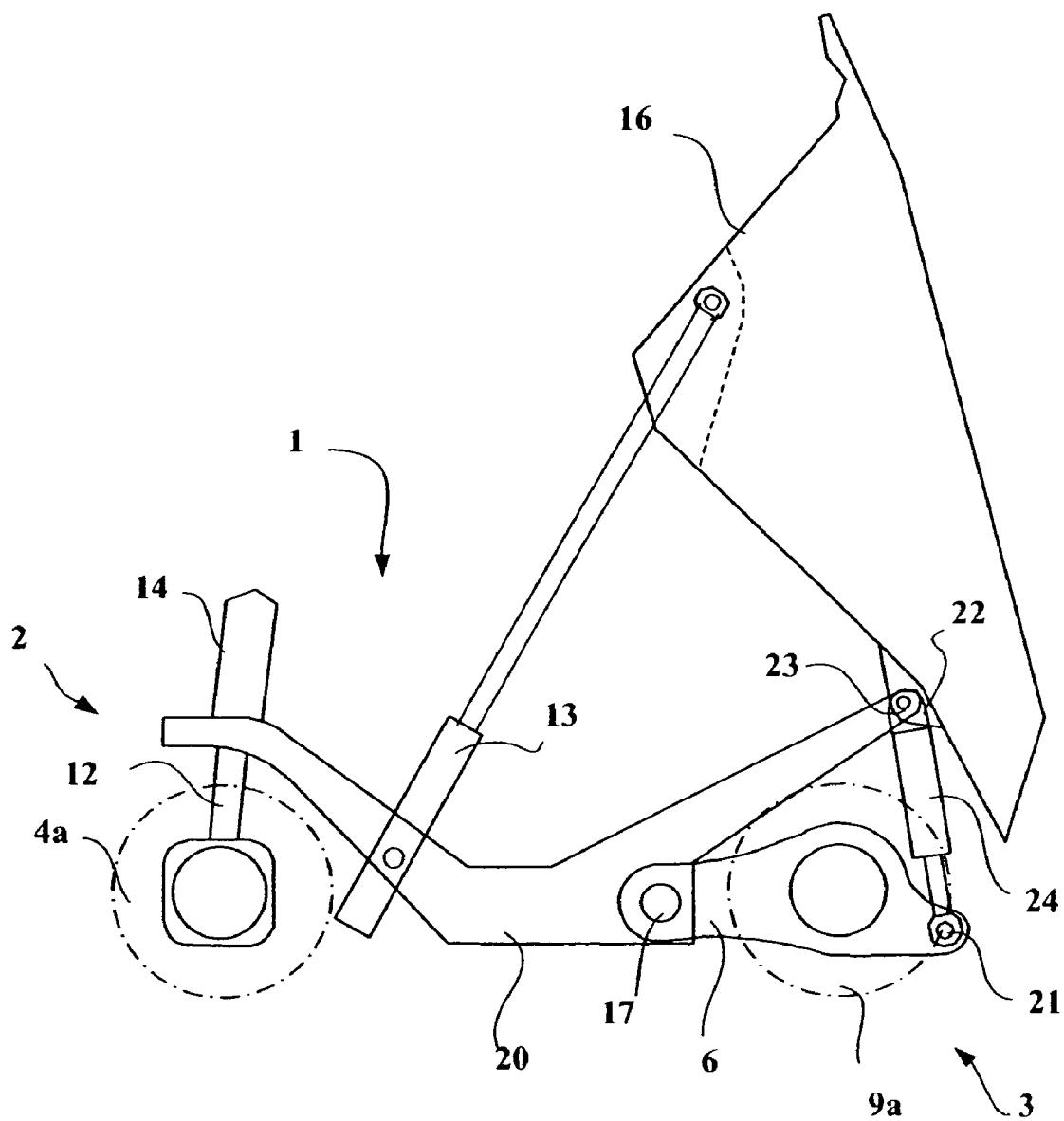
FIG. 3 is a schematic representation of a side view of the vehicle of FIG. 1, the dump body being in a different position.

The dump body 16 is thus supported virtually directly by the different suspension systems 14, 15, 24 of the vehicle 1, which are themselves in virtually direct contact with the tires. As FIG. 3 shows, the same is true when the dump body 16 is in a position corresponding to an unloading situation.

The dump body 16 is additionally connected to the chassis 20 by two telescopic piston-cylinder units 13 which allow the dump body to discharge its load by causing it to rotate about the axis 23. The device causing rotation of the dump body may be any other means known to the person skilled in the art; it is possible in particular to make such a device so as to be independent of the chassis, either in the form of a device which comes to rest on the ground, or of a device which is split into two elements, one of which is connected to the suspension device of the front axle and the other to one of the trailing arms of the rear axle.

The structure of the chassis of the vehicle 1 may thus be simplified considerably relative to that of conventional vehicles. This simplification of the structure of the chassis has a direct impact on the weight of the vehicle. Furthermore, it makes it possible to provide a relatively free central portion 25 and consequently to allow the bottom part of the dump body 16 to pass through, said dump body having a different shape from that of conventional vehicles. Such an embodiment thus makes it possible for the vehicle to have a relatively low centre of gravity.

The three trailing arms 6, 7, 8 of the rear axle are designed to be raisable. The central arm 7 may in particular be raised, via for example the suspension device 24 which is associated therewith, if the vehicle is not transporting a load, so as not to cause wear to the tires 10a, 10b when their use is unnecessary.

The arms 6 and 8 may in particular be raised to allow operations to be performed, such as tire changes, which will be examined further below.

According to an advantageous variant of the invention, the only essential function of the tires 9a and 11b of the rear axle 3 of the vehicle 1 is load-bearing—they do not participate in the transmission of motive power Such an embodiment consists in fixing the tires 9a and 11b on a system of the free wheeling type, which allows free rotation of said tires 9a and 11b. The invention should not be understood as being limited to this type of embodiment: according to other embodiments, the tires 9a and 11b may transmit part of the motive power.

According to other variants of the invention, the tires 9a and 11b may participate in transmission of the motive power either permanently or temporarily, as mentioned above, or alternatively variably, for example by using electric motors 26. One or more of the trailing arms 6, 7, 8 of the vehicle 1 can be designed to incorporate a braking device 33, such as brake discs.

The invention may also provide for the tires 4b, 5a mounted on the front axle 2 also to participate in transmission of the motive power. As mentioned above with reference to the rear axle 3, the sole function of the tires 4a, 5b is then load-bearing. The fact that the tires 4b, 5a transmit part of the motive power may improve handling of the vehicle on curved trajectories. In fact, motive power transmitted partially by the tires of the front axle 2 may facilitate following of the trajectory when these same tires are turned, in particular when the vehicle 1 is loaded. It would appear, in fact, that under certain loading and travel conditions, handling of such a vehicle over a curved trajectory is very difficult or indeed impossible, since the vehicle does not respond to the turning imposed by the tires of the front axle. These conditions may furthermore result in splitting and destruction of the tires of the front axle.

Figure 4:
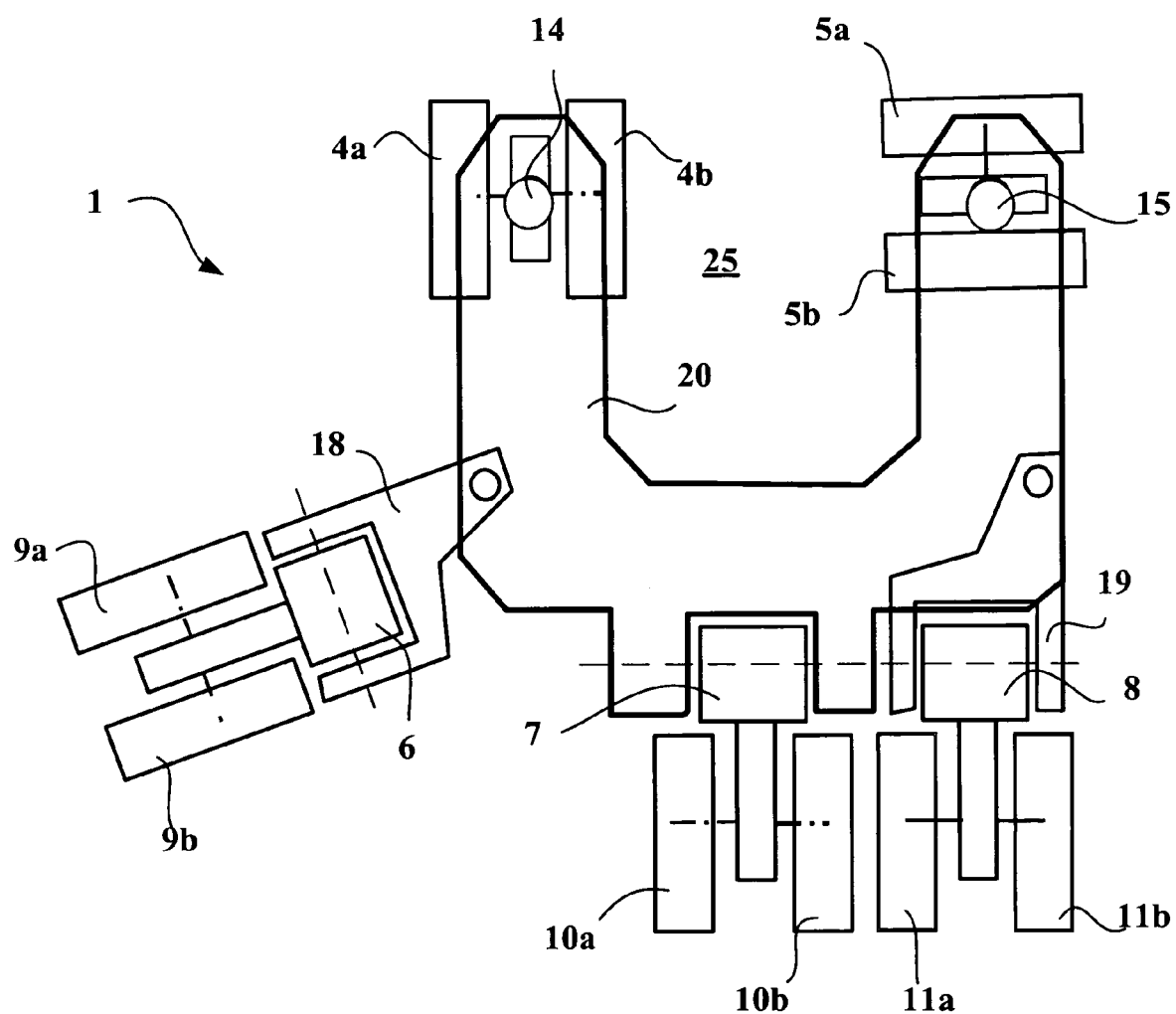
FIG. 4 is a schematic representation of a plan view of the same vehicle, in a configuration allowing operations to be performed on some of the tires

In FIG. 4, the vehicle 1 is shown in a situation allowing operations to be performed on the tires 9b, 10a, 5a, in particular allowing them to be changed.

The turning shaft 12, which coincides with the suspension device 15, of the front axle 2 allowing rotation over at least 90° relative to the longitudinal direction, makes it possible to position the tire 5a, axially to the inside during movement of the vehicle, in such a way that the axis of rotation of the tire 5a substantially coincides with the direction of forward movement of the vehicle in a longitudinal direction of the vehicle. It is of course possible to perform the same operation with the other turning shaft 12, which coincides with the suspension device 14, and the tire 4b. Such an operation on these tires is advantageously accompanied by putting the vehicle on blocks, such as a piston-cylinder unit, not shown in the Figures, linked to the chassis.

The vehicle 1 and more specifically the trailing arms 6, 8 are designed to make it relatively easy to perform operations directly on the tires 9b, 10a, 10b, 11a, which are inaccessible when the vehicle is in its travel state.

For this purpose, the vehicle 1 is provided with two devices 18, 19 themselves linked to the chassis 20 by substantially vertical shafts, not shown in the Figures, allowing rotation in accordance with said substantially vertical shafts.

Before pivoting a trailing arm, the vehicle is positioned beforehand on blocks such as piston-cylinder units, not shown in the Figures, linked to the chassis. The arm in question is subsequently raised and then locked in this position and the suspension device linked to said arm is detached either from the chassis or from the trailing arm so as to allow pivoting. The arm is then pivoted about said vertical shaft such that of operators may carry out operations on the fixing means of the tires and/or of the wheels of said trailing arm. In FIG. 4, the trailing arm 6 has thus been pivoted to provide ease of access to tires 9b and 10a.

Figure 5:
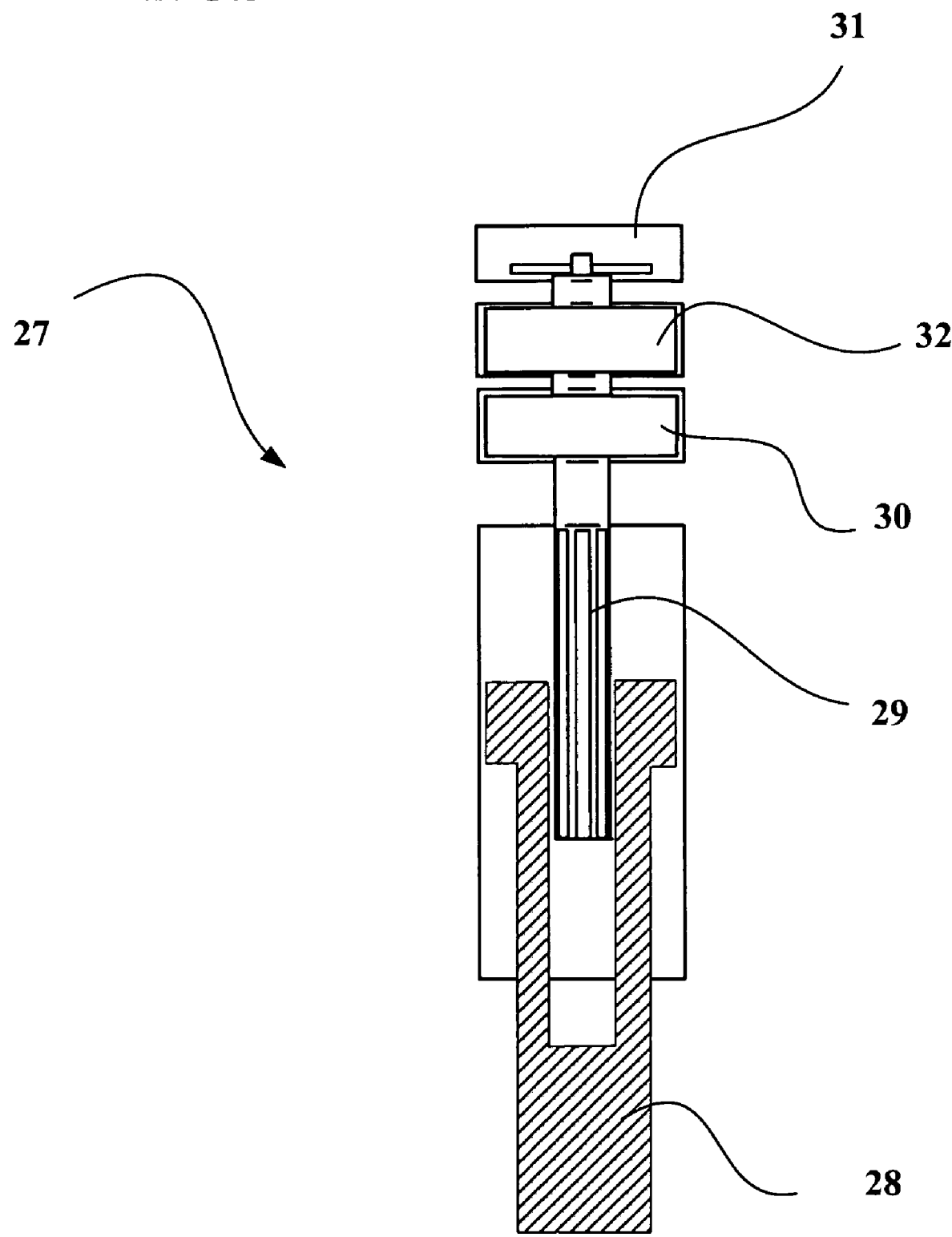
FIG. 5 is a schematic representation of an example of a combined turning and suspension device.

FIG. 5 shows an example of a combined turning and suspension device 27 consisting of a suspension column 28 associated with a turning shaft 29. The turning shaft is fluted in its axial direction to allow drive of the entire device 27 in the event of turning. The turning shaft is actuated by a rotary piston-cylinder turning unit 30 which allows actuation by the steering wheel. This type of actuation is imposed simultaneously on the two devices 27 of the front axle. This independent control of the two turning shafts is controlled by an electronic card based on a theoretical law of the Jeantaud or Ackermann type. A device 31 for controlling the turning angle ensures that this actuation system is well managed. This actuation system, known as a master system, of each of the turning shafts is supplemented by safety systems and, more particularly in the case of FIG. 5, by a rotary piston-cylinder safety unit 32. In the event of failure of the electronic control of one of the turning shafts or of a rotary piston-cylinder turning unit 30, the rotary piston-cylinder safety unit 32 is designed to take over and allow more conventional actuation according to which the two turning shafts are actuated by identical angles. The rotary piston-cylinder safety units of each of the devices 27 may for example be associated with a hydraulic circuit which ensures turning by the same angle for the two devices 27.

The vehicle thus embodied allows a loading capacity greater than that of current vehicles, of the order of 1000 metric tons. The design of a vehicle of the dumper type, intended for the same loading capacity and equipped with four tires arranged in pairs on the rear axle and with two tires on the front axle was simulated.

Since this type of vehicle does not exist, it was impossible to carry out tests; however, calculations and simulations provide simple ways in which the person skilled in the art may, for a given transportable load, define the dimensions of the tires as well as the stresses imposed on the tires and consequently obtain an estimate of the wear and fatigue which they withstand.

The tires required to produce such a vehicle would be of the dimension 85/65R72 which corresponds to a diameter of approximately 4.60 meters; this dimension is problematic since it is not compatible with the available transportation means and conditions.

The travel simulations which have been performed show that the vehicle according to the invention as described above allows travel with a level of tire wear and a tire service life which are entirely acceptable, whereas the vehicle produced according to a conventional design results in premature wear to the tires and limited service lives.

Furthermore, calculations of overall size were made on the basis of said two vehicles; the results obtained show that the vehicle according to the invention exhibits an axial width, measured in the direction of an axle, of 10.60 meters. The axial width, measured in the same manner for the rear axle of the vehicle comprising four tires arranged in pairs over said axle is 12.50 meters. This difference in size between said two vehicles makes it possible to envisage vehicles according to the invention traveling along existing tracks in mines transporting loads which are greater than the capacities of current vehicles.

In conclusion, it would appear that the vehicle according to the invention exhibits a loading capacity compatible with good tire behavior in terms of wear and performance, such a combination of these features not being achievable with the vehicles of this type which are currently available.

What is claimed is:

1. A heavy vehicle of a mass greater than 500 metric tons, the vehicle being fitted with tires of radial structure of an outer diameter greater than 3.5 meters having an axial width greater than 37 inches, the vehicle comprising:
   a front steering axle provided with at least two tires,
   a rear axle comprising at least four tires for transmitting at least part of motive power, and
   a dump body tiltable about a substantially horizontal axis,
   wherein the rear axle comprises at least two trailing arms each associated with two tires, the trailing arms being associated individually with suspension systems, the axis of the suspension systems intersecting with the axis of rotation of the tiltable dump body.

2. The vehicle according to claim 1, wherein the rear axle comprises three trailing arms.

3. The vehicle according to claim 2, wherein the trailing arms comprise an axially inner trailing arm pivotable in a longitudinal plane perpendicular to a plane of travel, at an angle of at least 90° in the direction of the plane of travel.

4. The vehicle according to claim 1, wherein at least one of the trailing arms is raisable.

5. The vehicle according to claim 1, wherein the trailing arms comprise axially outer trailing arms pivotable about an axis perpendicular to the plane of travel.

6. The vehicle according to claim 1, wherein at least one of the trailing arms comprises at least one braking device.

7. The vehicle according to claim 1, wherein the front steering axle is provided with four tires associated in pairs with a substantially vertical turning shaft.

8. The vehicle according to claim 7, wherein two paired tires of the front axle are distributed symmetrically about said turning shaft.

9. The vehicle according to claim 1, wherein the front steering axle is associated with suspension devices, which incorporate turning shafts.

10. The vehicle according to claim 1, wherein the front steering axle comprises two turning shafts, which are actuated independently.

11. The vehicle according to claim 1, wherein at least two of the at least four tires that comprise the rear axle transmit at least part of the motive power.

12. The vehicle according to claim 1, wherein at least three of the at least four tires that comprise the real axle transmit at least part the motive power.

13. The vehicle according to claim 1, wherein the front steering axle comprises at least two tires transmitting part of the motive power.

14. The vehicle according to claim 1, wherein the front steering axle comprises four tires and wherein at least two of the four tires transmit at least part of the motive power.

15. The vehicle according to claim 1, wherein at least some of the tires transmitting the motive power are actuated by an electric motor.

16. The vehicle according to claim 1, wherein the tires are directly mounted on the respective axles without using a wheel.

* * * * *